(12) United States Patent
Blau et al.

(10) Patent No.: US 6,280,081 B1
(45) Date of Patent: Aug. 28, 2001

(54) METHODS AND APPARATUS FOR CALIBRATING TEMPERATURE MEASUREMENTS AND MEASURING CURRENTS

(75) Inventors: David Blau, Cupertino; Elia Jadushlever, Foster City, both of CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/351,039

(22) Filed: Jul. 9, 1999

(51) Int. Cl.[7] .............................. G01K 15/00; G05F 3/16; G01R 17/00
(52) U.S. Cl. ..................... 374/1; 324/57; 324/64; 324/65; 324/66; 324/99; 323/316; 327/512; 374/121; 374/2
(58) Field of Search ..................... 374/121, 1–2, 374/132; 324/57, 64–66, 99; 327/512, 538, 540, 308; 323/316

(56) References Cited

U.S. PATENT DOCUMENTS

| | | | |
|---|---|---|---|
| 5,646,619 | * | 7/1997 | Daubert et al. ............... 341/118 |
| 5,712,590 | * | 1/1998 | Dries et al. ................... 327/539 |
| 5,820,261 | | 10/1998 | Yam ................................. 374/2 |
| 5,848,842 | | 12/1998 | Peuse et al. ...................... 374/1 |
| 5,870,044 | * | 2/1999 | Dell'ova et al. ............... 341/120 |
| 6,037,577 | * | 3/2000 | Tanaka et al. ................ 250/208.1 |
| 6,052,020 | * | 4/2000 | Doyle ............................. 327/539 |
| 6,140,868 | * | 10/2000 | Shoaei et al. ................... 327/561 |

* cited by examiner

Primary Examiner—G. Bradley Bennett
Assistant Examiner—Gail Verbitsky
(74) Attorney, Agent, or Firm—Pennie & Edmonds LLP (57) ABSTRACT

A calibration current source and methods of calibrating temperature measurements made during, e.g., an RTP process are described. The calibration current source preferably includes a biasing circuit, an output transistor current source, and an offset circuit. The biasing circuit has an input, a reference voltage output and a biasing voltage output. The output transistor current source is coupled to the biasing voltage output and is configured to produce an output current. The offset circuit is coupled in a feedback loop between the reference voltage output and the biasing circuit input and is configured to generate from the reference voltage output a variable offset voltage for selectively controlling the biasing voltage applied to the output transistor current source. In a temperature calibrating method a calibration table is generated by applying a plurality of input signals to a calibration current source to produce a plurality of output signals. The calibration table is stored. When an output signal of a photodetector is received the calibration input signal corresponding to the received photodetector output signal is determined based upon the stored calibration table.

24 Claims, 8 Drawing Sheets

METHODS AND APPARATUS FOR CALIBRATING TEMPERATURE MEASUREMENTS AND MEASURING CURRENTS

BACKGROUND OF THE INVENTION

This invention relates to methods and apparatus for calibrating temperature measurements, e.g., during rapid thermal processing of substrates, and for measuring currents.

In rapid thermal processing (RTP), a substrate is heated quickly to a high temperature, such as 1200° C., to perform one or more fabrication steps such as annealing, cleaning, chemical vapor deposition, oxidation, or nitridation. To obtain high yields and process reliability in the manufacture of submicron devices, the temperature of the substrate during such fabrication steps must be precisely controlled. For example, to fabricate a dielectric layer with a thickness of 60–80 Å and a uniformity of ±2 Å, the temperature in successive thermal processing runs should not vary by more than a few degrees centigrade (° C.) from the target temperature. To achieve this level of temperature control, the temperature of the substrate should be measured in real time and in situ.

Optical pyrometry is a technology that is used to measure substrate temperatures in RTP systems. An optical pyrometer using an optical probe samples the emitted radiation intensity from the substrate, and computes the temperature of the substrate based on the spectral emissivity of the substrate and the ideal black body radiation-temperature relationship given by Planck's law:

$$\Psi_b(\lambda, T) = \frac{C_1}{\lambda^5 \left(e^{\frac{C_2}{\lambda T}} - 1\right)}$$

where $C_1$ and $C_2$ are known constants, $\lambda$ is the radiation wavelength of interest, and T is the substrate temperature measured in degrees Kelvin (° K). The spectral emissivity $\epsilon(\lambda,T)$ of an object is the ratio of its emitted spectral intensity $\Psi(\lambda,T)$ to the spectral intensity $\Psi_B(\lambda,T)$ of a black body at the same temperature. That is, $$\epsilon(\lambda, T) = \frac{\Psi(\lambda, T)}{\Psi_b(\lambda, T)}$$

Since $C_1$ and $C_2$ are known constants, under ideal conditions, the temperature of the substrate can be accurately determined if $\epsilon(\lambda,T)$ is known.

When the temperature measurement system is first installed into the RTP system, the optical probe must be calibrated so that it produces an accurate temperature reading when exposed to the radiation emitted by the heated substrate. The temperature measurement system also must be periodically recalibrated because the temperature sensed by the probe may shift over time. Such temperature measurement shifts may be caused by, e.g., contamination of or damage to the light pipe that is used to sample the emitted radiation being emitted from the substrate, or by drifts in the electronic components of the pyrometer.

SUMMARY OF THE INVENTION

The invention features an inventive calibration current source and methods of calibrating temperature measurements made during, e.g., an RTP process (such as an RTP process described in U.S. Pat. No. 5,660,472). The invention also features an RTP system that incorporates these inventive calibration current source and temperature measurement calibrating methods.

In one aspect, the invention features an apparatus that includes a biasing circuit, an output transistor current source, and an offset circuit. The biasing circuit has an input, a reference voltage output and a biasing voltage output. The output transistor current source is coupled to the biasing voltage output and is configured to produce an output current. The offset circuit is coupled in a feedback loop between the reference voltage output and the biasing circuit input and is configured to generate from the reference voltage output a variable offset voltage for selectively controlling the biasing voltage applied to the output transistor current source.

Embodiments may include one or more of the following features.

The biasing circuit preferably includes first and second reference voltage circuits having respective inputs coupled to the biasing circuit input and respective outputs. The first and second reference voltage circuits each preferably includes a precision current source coupled to a transistor current source; the precision current sources substantially fixed the voltage difference between the biasing circuit input and the outputs of the first and second reference voltage circuits. The voltages generated at the outputs of the first and second reference voltage circuits preferably substantially correspond to the sum of the voltage generated by the offset circuit and the voltages substantially fixed by the precision current sources. The transistor current sources of the first and second reference voltage circuits may be matched to the output transistor current source. The biasing circuit preferably further includes a differential amplifier having first and second inputs respectively coupled to the outputs of the first and second reference voltage circuits and an output corresponding to the reference voltage output of the biasing circuit. The biasing voltage output may correspond to the output of the second reference voltage circuit.

In one embodiment, the offset circuit includes a digital to analog converter (DAC) that is coupled to the reference voltage output, and has an input configured to receive an input signal controlling the offset voltage generated from the reference voltage. The DAC input signal preferably controls the value of the output current in a one-to-one relationship. A log integrator circuit having an input coupled to receive the current output produced by the output transistor current source may be provided. A processor coupled to an input of the DAC and configured to generate a calibration table relating log integrator output voltage to DAC input signal value and a memory configured to store the calibration table generated by the processor also may be provided. A photodetector preferably is coupled to the input of the log integrator. In one embodiment, a processing chamber and a light pipe extending into the processing chamber are provided. The photodetector may be coupled directly to the light pipe.

The invention also features a current measurement circuit (a "log integrator") that includes an amplifier having an input and an output, a capacitor coupled between the input and the output of the amplifier, and a transistor coupled in parallel with the capacitor between the input and the output of the amplifier.

In one embodiment, a switch is coupled in parallel with the capacitor and the transistor between the input and the output of the amplifier.

In another aspect, the invention features a method in which a calibration table is generated by applying a plurality of input signals to a calibration current source to produce a plurality of output signals. The calibration table is stored. When an output signal of a photodetector is received, the calibration input signal corresponding to the received photodetector output signal is determined based upon the stored calibration table.

The received photodetector output signal may correspond to a measure of radiation intensity emitted by a substrate being processed. The temperature of the substrate may be computed based upon the calibration input signal determined to correspond to the received photodetector output signal. The calibration table may be generated between substrate processing runs inside a processing chamber.

Among the advantages of the invention are the following.

The invention enables temperature measurements to be readily calibrated over a wide dynamic range (e.g., over ten decades) without requiring an external calibration current source. The calibration may be performed on-the-fly between substrate processes and when the thermal processing system otherwise is idle. This feature reduces the maintenance cycle time for the system. The invention may be integrated onto the same circuit board as the photodetector and, therefore, may be configured to compensate for temperature-induced changes in the photodetector measurements. The invention may be implemented with a small footprint and therefore may be mounted directly to the optical transmission channel (e.g., light pipe), avoiding the need to transmit the radiation emitted by the substrates over fiberoptic cables which introduce noise into the temperature measurements.

The calibrator of the invention features a very wide dynamic range. The output current of the calibrator may be changed quickly and easily merely by sending a control signal to the DAC input of the calibrator. Also, the calibrator may calibrate many circuits simultaneously. Furthermore, the calibrator may remain connected to the circuit to be calibrated because the output impedance of the calibrator is sufficiently high that the calibrator does not degrade the noise characteristics of circuits connected to the calibrator.

The current measurement circuit of the invention achieves the low noise performance and linearity of an integrator with reset at low current levels, and the wide dynamic range of a logarithmic amplifier (log amp) at high current levels.

Other features and advantages will become apparent from the following description, including the drawings and the claims.

DETAILED DESCRIPTION

Figure 1A:
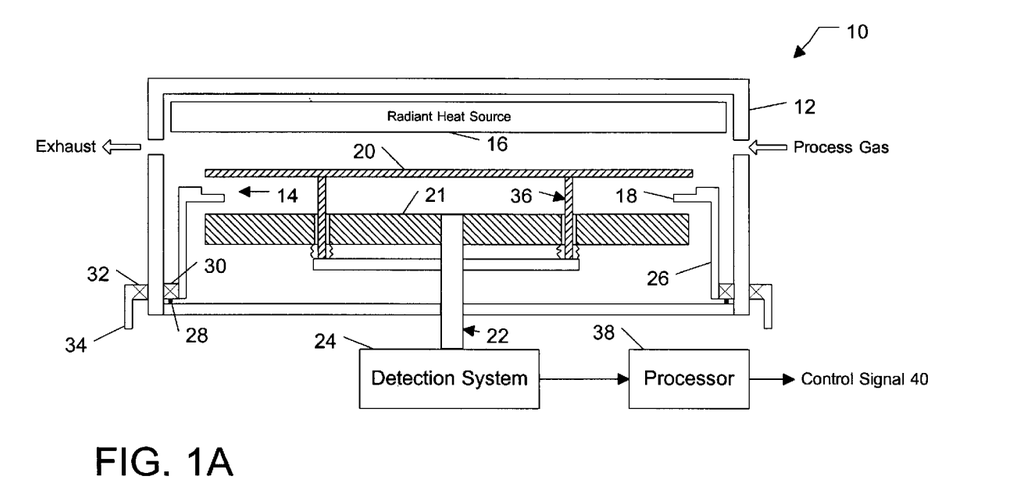
FIG. 1A is a diagrammatic view of a substrate being loaded into a thermal processing chamber that includes a radiant heat source, a detection system, and a processor.
Figure 1B:
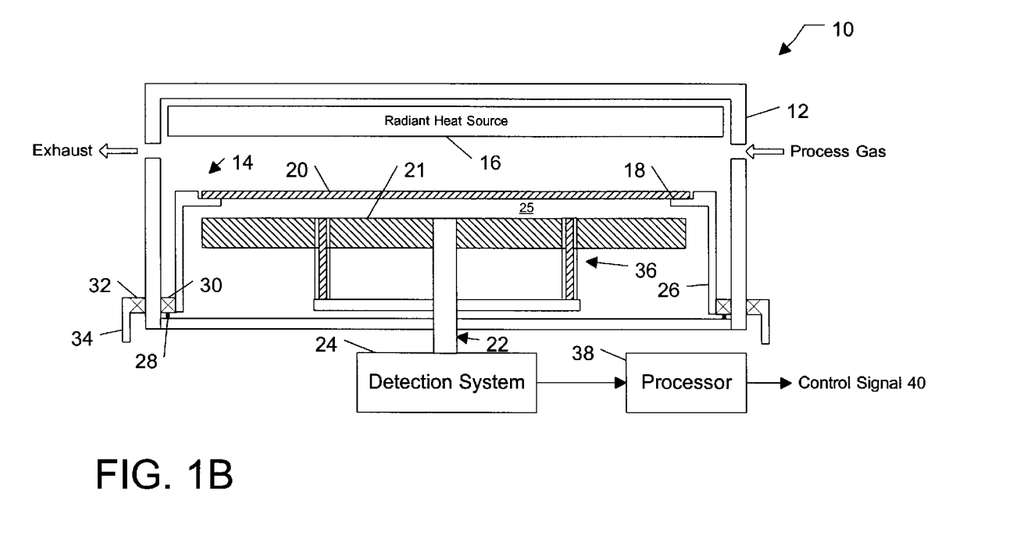
FIG. 1B is a diagrammatic view of the substrate being supported by an edge ring inside the thermal processing chamber of FIG. 1A.

Referring to FIGS. 1A and 1B, a thermal processing apparatus 10 includes a chamber 12 that contains a substrate support 14 and a radiant heat source 16. Substrate support 14 includes a support ring 18 which contacts the peripheral edge of a substrate 20 (e.g., a semiconductor wafer, a flat panel display, a glass plate or disk, or a plastic workpiece). Support ring 18 contacts only a minor fraction of the bottom surface of substrate 20, leaving a major fraction of the bottom substrate surface exposed to emit radiation toward a reflector 21 and an optical transmission channel 22 (e.g., a light pipe formed from quartz or sapphire) which is coupled to a detection system 24. When substrate 20 is supported by support ring 18, the underside of substrate 20 and the top surface of reflector 21 form a reflecting cavity 25 (FIG. 1B) for enhancing the effective emissivity of substrate 20. Support ring 18 is mounted on a support tube 26 which, in turn, is rotatably supported by a bearing assembly 28. Magnets 30, which are mounted on bearing assembly 28, magnetically couple with magnets 32 which are mounted on a drive ring 34. In operation, drive ring 34 rotates and, by magnetic coupling, causes support tube 26 and support ring 18 to rotate. In an alternative embodiment, bearing assembly 28 and magnets 30, 32 may be replaced by a sealed drive assembly. Chamber 12, radiant heat source 16, and reflector 21 preferably are water-cooled.

In operation, radiant heat source 16 heats the interior of chamber 12 to a preheat temperature (e.g., about 200–400° C.). Subsequently, a robot arm moves substrate 20 into chamber 12 through an opening in housing 12. A lift pin assembly 36 rises up from beneath substrate 20, lifts substrate 20 off of the robot arm (at which point the robot arm may be withdrawn from chamber 12), and lowers substrate 20 onto support ring 18. To avoid problems (e.g., substrate warpage and other substrate degradation) that might result from the rapid increase in temperature caused by contact of substrate 20 with the preheated substrate support 14, lift pin assembly 36 holds substrate 20 in a fixed position adjacent to radiant heat source 16 until the temperature of substrate 20 is within a desired temperature range (e.g., 200–400° C.). At this point, substrate 20 may be lowered onto support ring 18 and substrate 20 may be processed (FIG. 1B). For example, substrate 20 may be processed by heating it to a temperature of about 700–1300° C. in accordance with a prescribed heating schedule.

Figure 2:
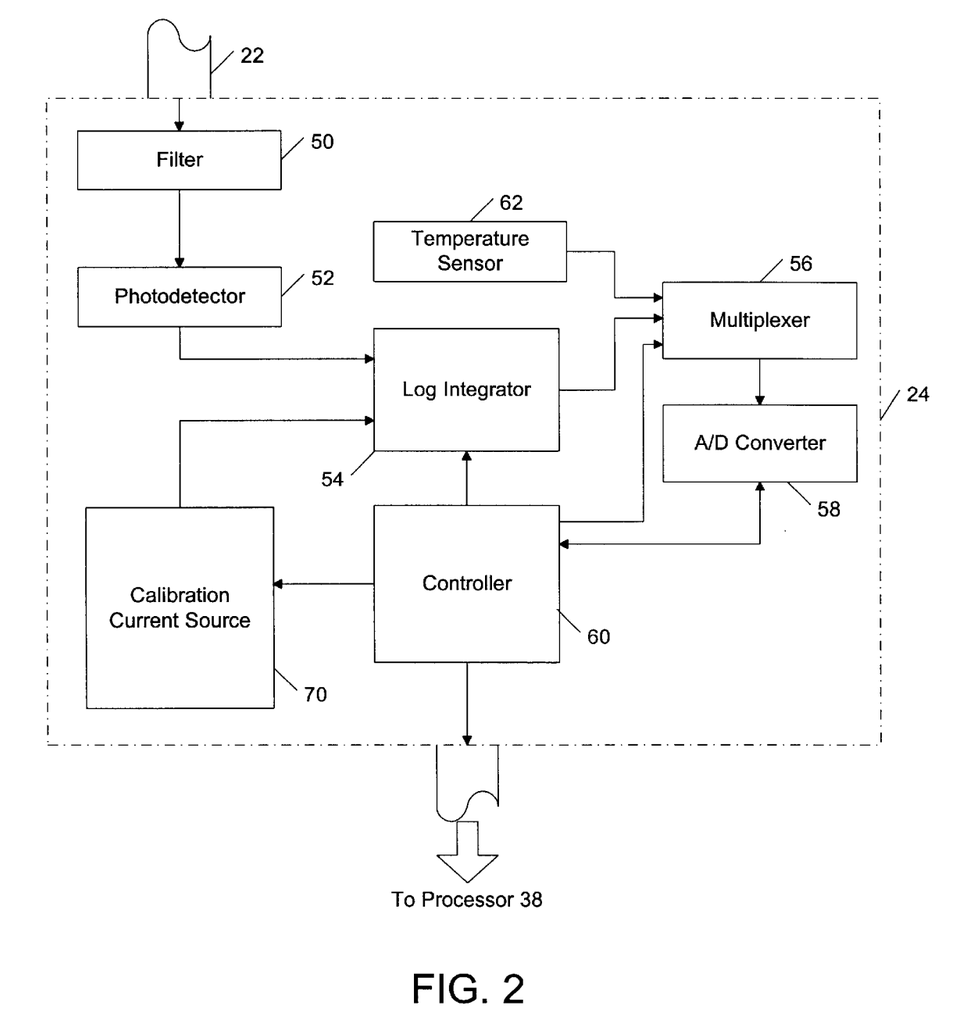
FIG. 2 is a diagrammatic view of the detector system of FIGS. 1A and 1B.

As shown in FIG. 2, detection system 24 is physically attached to optical transmission channel 22. Detection system 24 includes a filter 50 (e.g., a bandpass filter formed from a glass plate coated with a quarter-wave stack with a passband of 0.89–0.93 microns) and a photodetector 52 (e.g., a silicon photodiode). During substrate temperature measurements, filter 50 blocks radiant heat source radiation that is transmitted through substrate 20, and photodetector 52 produces a current signal that corresponds substantially to the intensity of the radiation emitted by substrate 20. The current output of photodetector 52 is applied to a current measurement circuit (log integrator) 54 which converts the photodetector current into a voltage output that is transmitted to a multiplexer 56. Multiplexer 56 selectively passes the analog voltage signal to an analog-to-digital (A/D) converter 58 for conversion into a digital voltage signal. The resulting digital signal is passed to a controller 60 that choreographs the operation of detection system 24. In one implementation, controller 60 includes a timing circuit, a flash digital signal processor (e.g., a TMS 320C206), and an RS485 transceiver. A temperature sensor 62 measures the temperature of detection system 24. The temperature sensor signals are selectively transmitted to A/D converter 58 and to controller 60. As described in detail below, controller 60 calibrates the digital photodetector signals received from A/D converter 58 and transmits the calibrated signals, as well as the digital temperature sensor signals, to processor 38 for conversion into a temperature measurement value.

Detection system 24 includes a temperature-compensating calibration current source 70 that enables temperature measurements to be readily calibrated over a wide dynamic range (e.g., over ten decades) without requiring an external calibration current source. The calibration may be performed on-the-fly between substrate processes and when thermal processing system 10 otherwise is idle. This feature reduces the maintenance cycle time for the system. Calibration current source 70 is integrated onto the same circuit board as the photodetector and, therefore, may be configured to compensate for temperature-induced changes in the photodetector measurements. Calibration current source has a small footprint and may be mounted directly to optical transmission channel 22, avoiding the need to transmit the radiation emitted by the substrates over fiberoptic cables which introduce noise into the temperature measurements.

In response to a series of input values received from controller 60, calibration current source 70 generates a series of calibration current values that are applied to log integrator 54 whose logarithmic voltage output is selectively passed to A/D converter 58 by multiplexor 56. The resulting voltage output values are stored in controller 60 as a calibration table from which calibrated signals may be obtained.

A Calibration Current Source Implementation

Figure 3A:
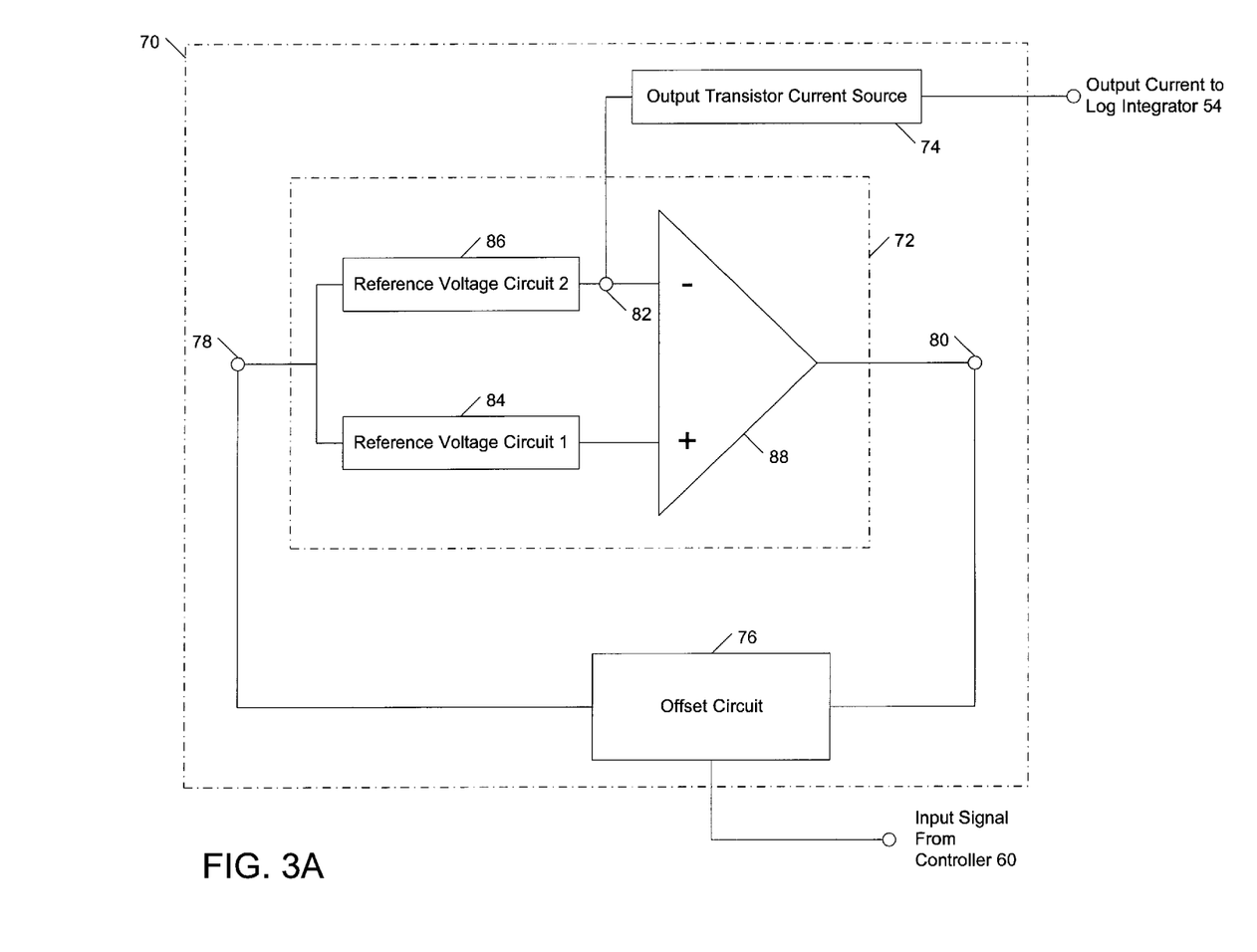
FIG. 3A is a block diagram of a calibration current source.

Referring to FIG. 3A, calibration current source 70 is implemented on a circuit board and includes a biasing circuit 72, an output transistor current source 74, and an offset circuit 76. Biasing circuit 72 has an input 78, a reference voltage output 80, and a biasing voltage output 82. Biasing circuit 72 also includes first and second reference voltage circuits 84, 86 and a differential amplifier 88 (e.g., a high-gain dc-coupled differential amplifier with a single-ended output, a high input impedance and a high common mode rejection ratio). First and second reference voltage circuits 84, 86 have respective inputs that are coupled to biasing circuit input 78 and respective outputs that are coupled to the inputs of differential amplifier 88. The output of second reference voltage circuit 86 forms biasing voltage output 82. The output of differential amplifier 88 forms biasing circuit output 80. First and second reference voltage circuits 84, 86 are configured to generate respective precision output voltages, and differential amplifier 88 is configured to generate a voltage at output 80 that corresponds to the difference between the output voltages of first and second reference voltage circuits 84, 86 multiplied by a gain factor (e.g., 10–40 and more preferably 20). Offset circuit 76 is configured to generate from reference voltage output 80 an offset voltage for controlling the biasing voltage applied to output transistor current source 74; the input signal received from controller 60 controls the value of the offset voltage generated by offset circuit 76. By applying a series of different input signals to offset circuit 76, a series of different output current may be produced by output transistor current source 74. Because the offset voltage is applied to the inputs of both reference voltage circuits 84, 86, differential amplifier 88 rejects the common mode offset voltage, and the voltage generated at reference voltage output 80 remains substantially constant, allowing it to be used as a reference voltage.

Figure 3B:
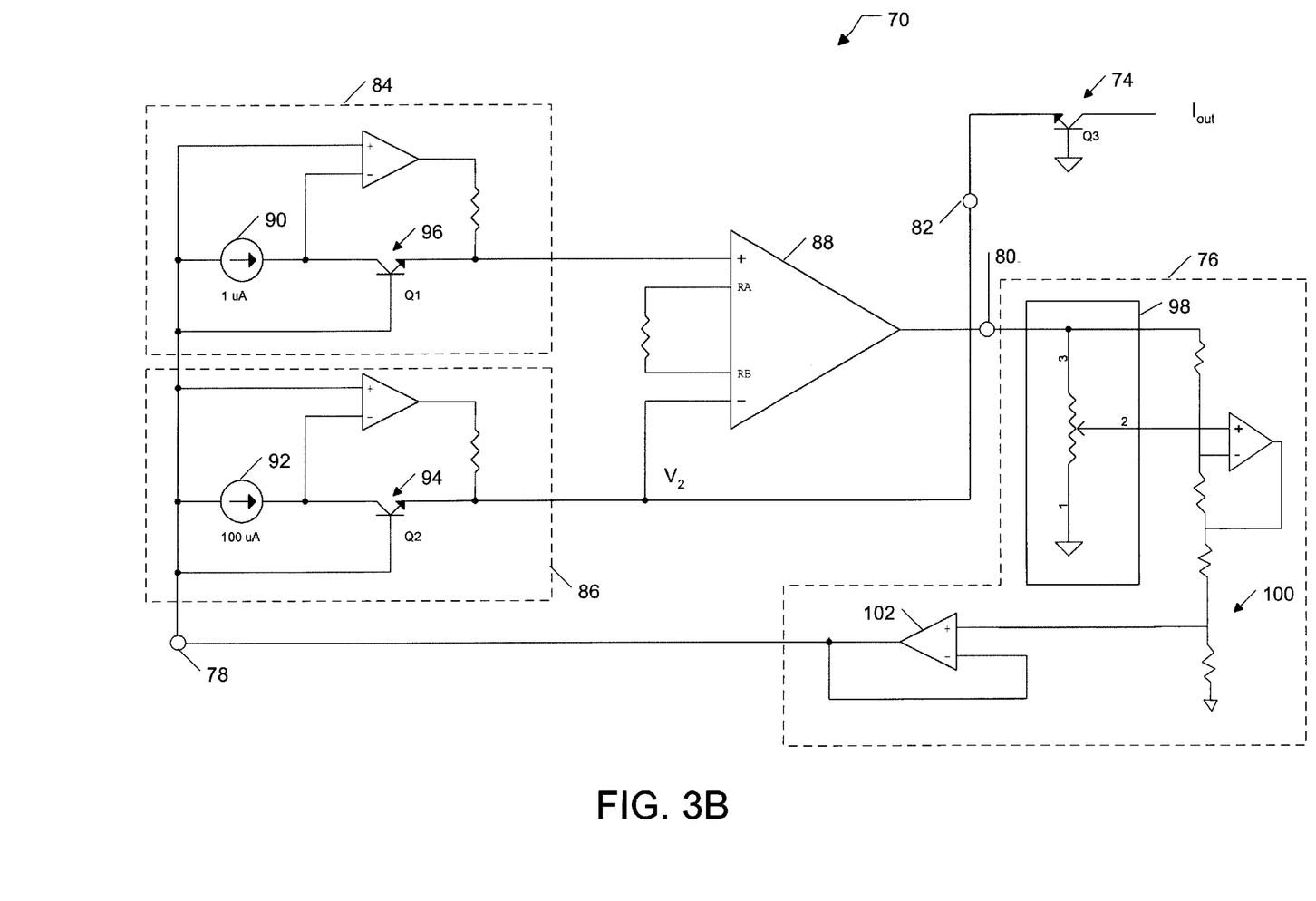
FIG. 3B is a circuit diagram of the calibration current source of FIG. 3A.

Referring to FIG. 3B, in one embodiment, first and second reference voltage circuits 84, 86 respectively include current sources 90, 92 coupled to transistors 94, 96 ($Q_1$, $Q_2$). Current sources 90, 92 may be conventional precision current source circuits configured to produce fixed currents ($I_1$, $I_2$) over time (e.g., $I_1=1$ μA and $I_2=100$ μA). Such currents fix the voltages ($V_{be,1}$, $V_{be,2}$) produced across bases and emitters of transistors 94, 96, in accordance with the following equations:

$$V_{be,1}=V_{t,1}ln(I_1/I_s)$$

$$V_{be,2}=V_{t,2}ln(I_2/I_s)$$

$V_{t,1;2}=kT/q$, where $k=1.381\times10^{-23}$ J/° K, T is the transistor temperature expressed in ° K, and $q=1.602\times10^{-19}$ C; $I_s$ is the reverse saturation current of the transistors. If transistor current sources 94, 96 are matched, $V_{t,1}=V_{t,2}$ Based upon these values, the output voltages ($V_1$, $V_2$) of reference voltage circuits 84, 86 referenced to ground are given by:

$$V_1=V_{offset}-V_{be,1}$$

$$V_2=V_{offset}-V_{be,2}$$

Accordingly, reference voltage output 80 ($V_{ref}$) is given by:

$$V_{ref}=V_{be,1}-V_{be,2}=V_t ln(I_1/I_2)$$

Thus, at room temperature (25° C.), $V_{ref}=2.38$ volts when $I_1=1$ μA, $I_2=100$ μA, and the gain of amplifier 88 is 20. Transistor current sources 90, 92 are matched to transistor current source 74 ($Q_3$) so that temperature-induced changes in $V_{ref}$ track temperature-induced changes in the biasing voltage applied across the input of transistor current source 74.

As shown in FIG. 3B, offset circuit 76 includes a digital-to-analog converter (DAC) 98 configured to produce a variable output voltage that is a controllable fraction of $V_{ref}$, which is produced at biasing circuit output 80. In one implementation, DAC 98 has a 16-bit input that is configured to receive control signals from controller 60 for selectively dividing $V_{ref}$ into 65,535 different voltage values between 0 and $V_{ref}$. Assuming every 60 mV increase in biasing voltage applied across the base and emitter of output transistor current source 74 corresponds to a decade increase in output current, a $V_{ref}$ value of 2.38 volts roughly corresponds to a dynamic current range of 40 decades. Thus, DAC 98 may vary the offset voltage over a voltage range that produces an output current that may vary over 40 decades. In an implementation designed for measuring temperatures from 200° C. to about 1300° C., the range of currents produced by photodetector 52 extends from about 10 pA ($10^{-11}$ A) to about 1 mA ($10^{-3}$ A). To generate a calibration table for this range of current values, the offset voltage need only span a voltage range that corresponds to an 8 decade current range. Accordingly, in this embodiment, offset circuit 76 includes a divider circuit 100 that reduces the offset voltage range by a factor of 5 (i.e., from 0 to $0.2\times V_{ref}$) to achieve the desired 8 decade dynamic current range.

After passing through a unity gain amplifier 102, the offset voltage produced at the output of divider circuit 100 is applied to the inputs of both first and second voltage reference circuits 84, 86. As explained above, precision current source 92 supplies a substantially fixed current (e.g., 100 µA) to the collector of transistor current source 96 ($Q_2$), substantially fixing the voltage across the base and emitter ($V_{be,2}$) of transistor current source 96 ($Q_2$). The resulting voltage ($V_2$) produced at biasing voltage output 82 is therefore given by:

$$V_2 = V_{offset} - V_{be,2}$$

As a result, the base-emitter voltage ($V_{be,output}$) applied to output transistor current source 74 is given by:

$$V_{be,output} = 0 - V_2 = V_{be,2} - V_{offset}$$

where $V_{offset}$ varies from 0 to $0.2 \times V_{ref}$ with 16-bit resolution. Because current source transistors 94, 96 ($Q_1$, $Q_2$) are matched to output transistor current source 74 ($Q_3$), temperature-induced changes in $Q_1$ and $Q_2$ are reflected in $Q_3$, assuring that the output current is substantially temperature-compensated.

The components of calibration current source 70 are adjusted prior to installation in thermal processing system 10. In particular, calibration current source 70 is adjusted so that a particular input value applied to DAC 98 corresponds to a particular output current. In one embodiment, the calibration current ($I_{cal}$) and the DAC input value ($In_{dac}$) are related by:

$$I_{cal} = \frac{IFS}{e^{0.000316212 \times In_{DIP}}} + 0.0386473 \times R_0$$

where IFS is the maximum value for $I_{cal}$ and $R_0$ is the base-emitter resistance of current source 74. In one implementation, IFS=1 mA, $R_0$=0.4 ohms, and $In_{DAC}$ may vary between 0 and 65,535. In this implementation, $I_{cal}$ values that are between 0 and 300 pA are linearly mapped to DAC input values ($In_{DAC}$); $I_{cal}$ values that are greater than 300 pA are derived from the above-identified exponential equation. In sum, this approach enables current values from output transistor current source 74 to be mapped to the input values applied to DAC 98. From this mapping precise calibration current values may be determined and sent to processor 38 for conversion into temperature measurement values. The mapping between DAC 98 input values and calibration current values is stored in controller 60.

Calibration current source 70 is characterized by a very wide dynamic range (e.g., 10 orders of magnitude with a 16-bit DAC). The upper end of the calibration current range is determined, at least in part, by the accuracy with which the base-emitter resistance ($R_0$) is measured. The upper current value of current source 74 is limited to a few mA, if an approximation is used for $R_0$; this limit may be extended to about 20 mA if $R_0$ is measured accurately. The low end of calibration current source 70 may extend down to below $10^{-17}$ amps.

The accuracy of the calibrator is quite high, and the output is only a function of fixed universal constants. In operation, an absolute output current accuracy of about 0.1% over 10 orders of magnitude is quite easy to achieve. In the above-described implementation, a 0.1% output current accuracy corresponds to an error of less than a 0.1° C. in the temperature measurements of detection system 24.

The output impedance of transistor current source 74 is sufficiently high that calibration current source 70 does not contribute noise to connected circuits. For this reason, calibration current source 70 may remain connected to current measurement circuit (log integrator) 54 without degrading its noise characteristics, even at very low current levels (e.g., 1 fA). Therefore a further advantage of this calibrator is it does not need to be disconnected when not in use.

A Current Measurement Circuit (Log Integrator) Implementation

Figure 4:
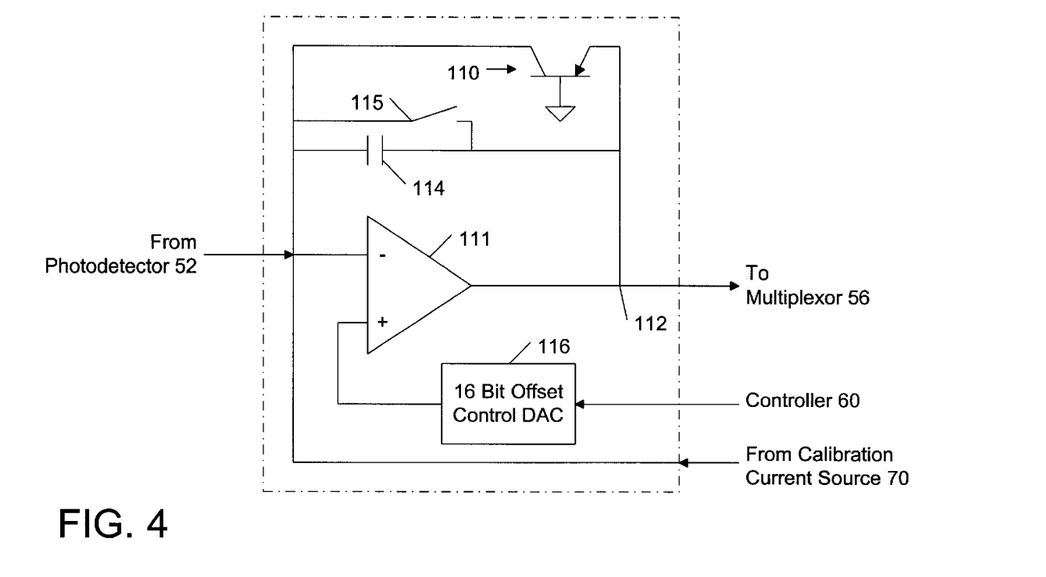
FIG. 4 is a circuit diagram of a log integrator.

Referring to FIG. 4, log integrator 54 includes a log amplifier circuit formed from a bipolar transistor 110 that is coupled in a feedback loop across the output and the negative terminal of an operational amplifier 111. The log amplifier receives a current input from either photodetector 52 or calibration current source 70, and to produce a voltage at log integrator output 112. Log integrator 54 also includes an integrator circuit formed from operational amplifier 111 and a capacitor 114 coupled in the feedback loop between the output and the negative terminal of operational amplifier 111. A switch 115, which is controlled by controller 60, provides a selectively controllable bypass across transistor 110 and capacitor 114. A 16-bit offset control DAC 116 adjusts the offset voltage at log integrator input 112 to compensate for noise generated by leakage currents in photodetector 52.

The voltage produced at log integrator output 112 is characterized by an initial linear relationship for low photodetector current values and a logarithmic relationship for higher current values. The integrator circuit measures low current values from photodetector 52 with very little noise and a wide dynamic range. Capacitance associated with transistor 110 increases the capacitance of the feedback loop, increasing the dynamic range of the integrator circuit at low current levels; at high current levels, the capacitance of transistor 110 does not set the bandwidth of log integrator 54. The use of bipolar transistor 110 in the feedback loop enables log integrator 54 to measure high photodetector current levels over a wide dynamic range. At a photodetector current level of about 500 pA, the integrator circuit and the log amplifier circuit operate in a mixed mode. A wide range precision current source may be used to calibrate log integrator 54 through the integrator and log amplifier current ranges, as well as in the mixed mode current range.

In sum, log integrator 54 may measure currents with the low noise performance and linearity of an integrator with reset at low current levels, and the wide dynamic range of a log amplifier at high current levels.

A Method of Calibrating Temperature Measurements

Figure 5A:
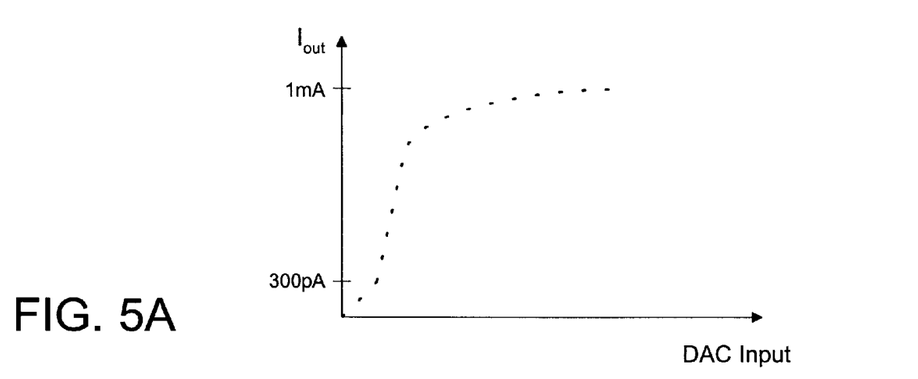
FIGS. 5A–5C are plots of mappings relating calibration source input to calibration source output, calibration source output to log integrator output, and photodetector output to log integrator output, respectively.
Figure 5B:
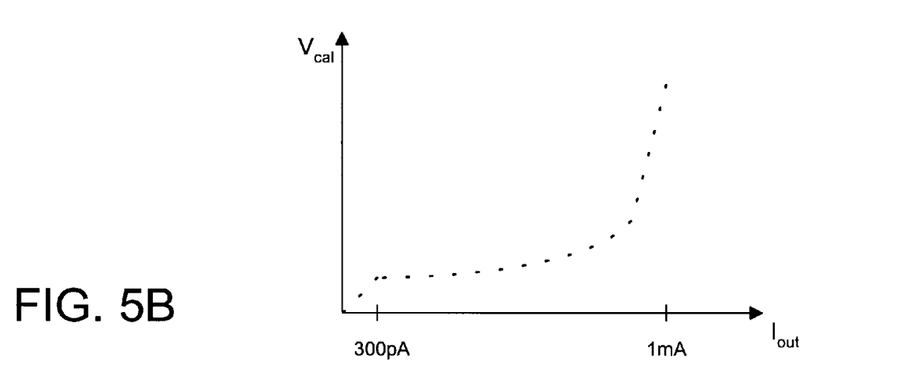
Figure 5C:
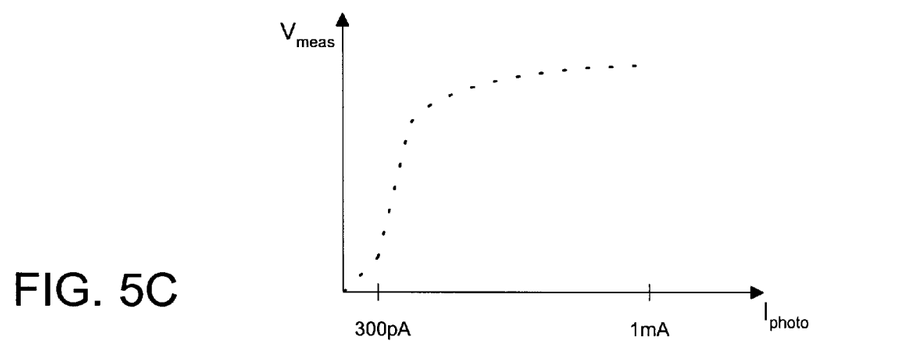

As shown in FIGS. 5A–5C, during calibration, a plurality of input values are applied to DAC 98 to produce a plurality of output current values ($I_{out}$; FIG. 5A). Log integrator 54 converts these current values into a plurality of calibration voltage values ($V_{cal}$; FIG. 5B). The relationships between input DAC values and log integrator output values are stored as a calibration table in the memory of controller 60. Based upon this information, a table of the following form may be generated:

| Calibration Table | | |
|---|---|---|
| $V_{cal}$ | DAC Input Value | $I_{cal}$ |
| $V_{cal,1}$ | $In_{DAC,1}$ | $I_{cal,1}$ |
| $V_{cal,2}$ | $In_{DAC,2}$ | $I_{cal,2}$ | where the values of $I_{cal}$ correspond to the previously determined calibration current values stored in controller 60. During substrate processing, log integrator 54 converts current values from photodetector 52 ($I_{photo}$) into a plurality of measurement voltage values ($V_{meas}$; FIG. 5C). Based upon the relationships between $V_{cal}$ and the DAC input values contained in the stored calibration table, controller 60 may convert (e.g., by interpolation or other known techniques) the measurement voltage values ($V_{meas}$) into corresponding DAC input values from which calibration current values ($I_{cal}$) may be determined and transmitted to processor 38 for conversion into temperature measurement values.

Figure 6:
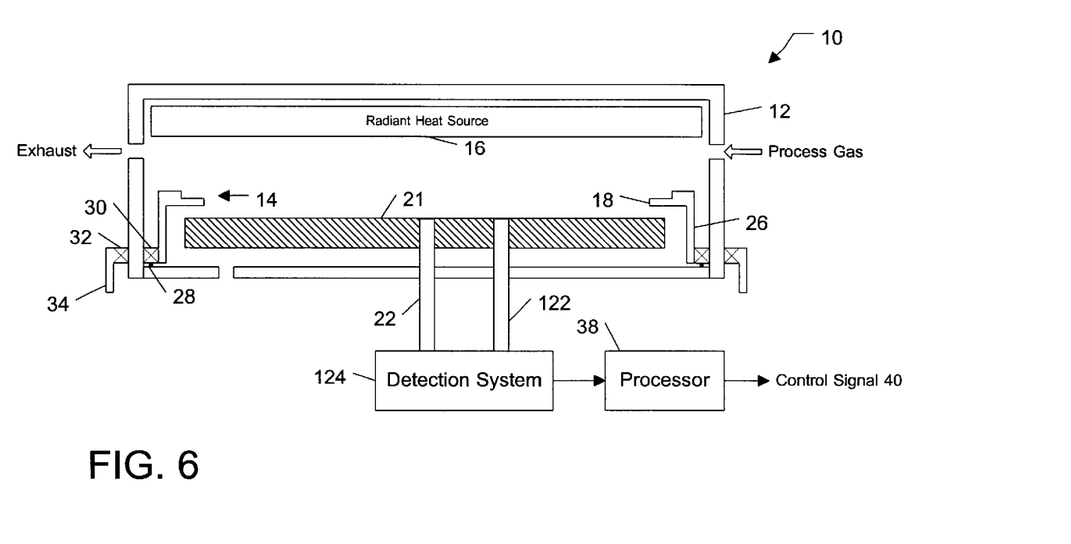
FIG. 6 is a diagrammatic view of a thermal processing chamber that includes two optical transmission channels.

Calibration current values may be converted into temperature measurement values based upon signals received from a single photodetector using Plank's law (see, e.g., Peuse et al. U.S. Pat. No. 5,660,472). Improved results may be achieved by computing temperature measurement values based upon two photodetector signals as described in U.S. application Ser. No. 09/130,253, filed Aug. 6, 1998, and entitled "A Sensor For Measuring A Substrate Temperature," which is incorporated herein by reference. As shown in FIG. 6, such a dual detector system may include a primary photodetector probe 22 and a secondary photodetector probe 122. The intensity $\Psi_1$ measured by the primary photodetector is given the following equation:

$$\Psi_1 = \epsilon_1 \Psi_B(T) = \epsilon_S \Psi_B(T) \cdot \frac{1}{1 - P_1(1 - \epsilon_S)}$$

and the intensity $\Psi_2$ measured by the secondary photodetector is given by the following equation:

$$\Psi_2 = \epsilon_2 \Psi_B(T) = \epsilon_S \Psi_B(T) \cdot \frac{1}{1 - P_2(1 - \epsilon_S)}$$

where $\epsilon_1$ and $\epsilon_2$ represent the effective emissivities of the primary and secondary photodetectors 120, 122, and $P_1$ and $P_2$ represent the effective reflectivities of reflector plate 21 to the first and second detectors.

The effective reflectivities $P_1$ and $P_2$ are system constants determined by the configuration of reflector 21, the actual reflectivity of reflector 21, and the configuration of reflecting cavity 25 (e.g., the distance between the reflector and the underside of the substrate). In order to calibrate the temperature sensors and determine the effective reflectivities $P_1$ and $P_2$, a substrate having a known emissivity may be processed in RTP system 10. For example, as discussed in the aforementioned U.S. Pat. No. 5,660,472, the temperature T of a substrate may be deduced from the thickness of an oxide layer formed thereon during thermal processing. The effective reflectivities $P_1$ and $P_2$ may then be calculated from the measured intensities $\Psi_1$ and $\Psi_2$, the actual emissivity $\epsilon_S$ of the substrate, the substrate temperature T, and the black body relationship.

Once the effective reflectivities $P_1$ and $P_2$ are known, detection system 124 may be used to determine the temperature of a substrate having an arbitrary emissivity. Specifically, given the measured values $\Psi_1$ and $\Psi_2$ and the known effective reflectivities $P_1$ and $P_2$, the equations for $\Psi_1$ and $\Psi_2$ may be solved to calculate the substrate emissivity $\epsilon_S$ and the black body intensity $\Psi_B$. Finally, an exact solution for the substrate temperature T may be calculated from the black body intensity $\Psi_B$ according to the ideal black body relationship given above.

The other methods described in U.S. application Ser. No.09/130,253 for converting the two calibrated photodetector signals into temperature measurement values also may be used.

Figure 7A:
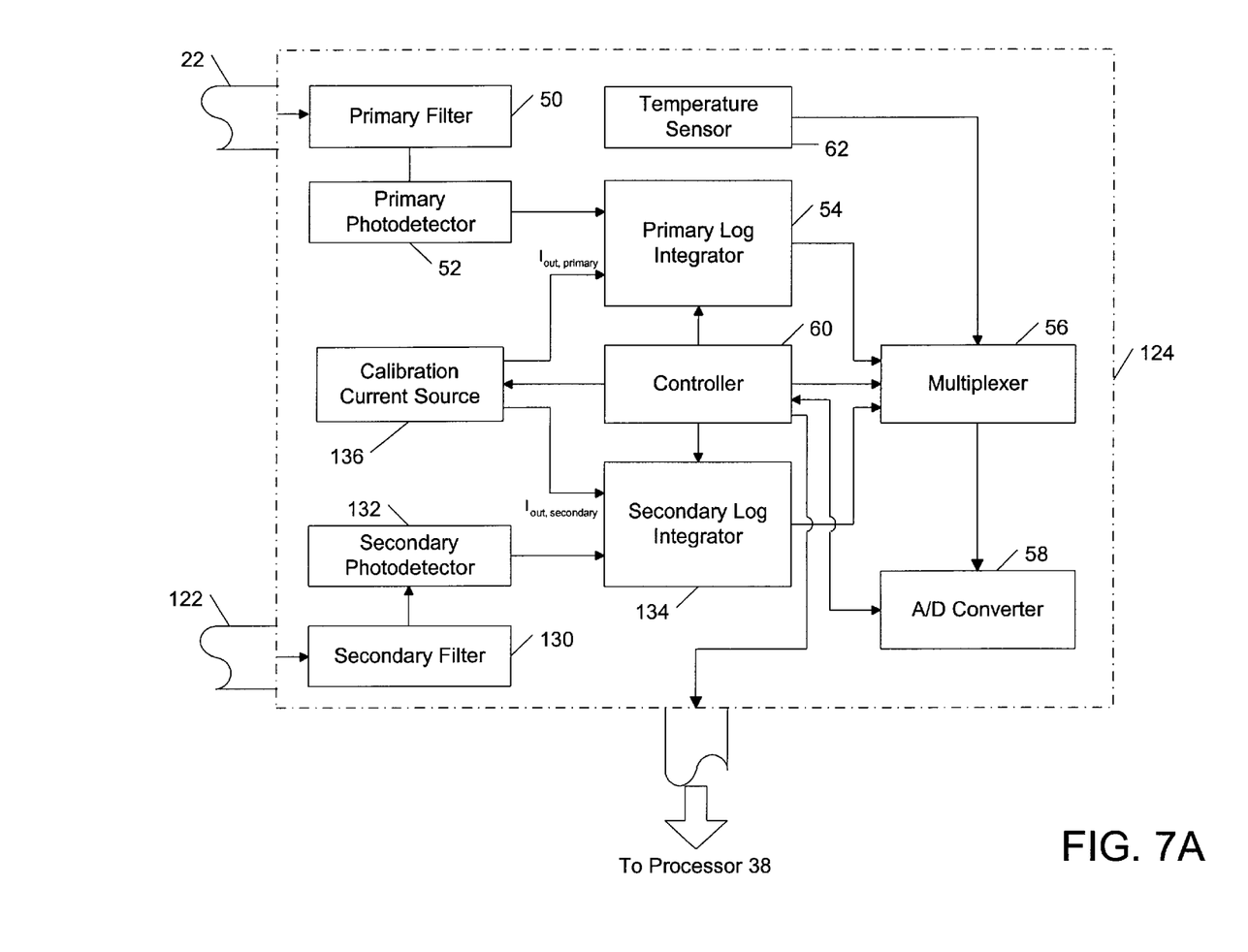
FIG. 7A is a block diagram of a calibration current source the accommodates the two optical transmission channels of FIG. 6.

Referring to FIG. 7A, a detection system 124, which may be used to convert emitted radiation received by photodetector probes 22, 122 into calibrated photodetector signals, has the same basic features of detection system 24 (FIG. 2) and further includes a secondary filter 130, a secondary photodetector 132 and a secondary log integrator 134 for converting radiation received by secondary photodetector probe 122 into secondary voltage measurement signals. Log integrator 134 may be implemented as shown in FIG. 4. In this embodiment, controller 60 is configured to separately calibrate the signals received from photodetectors 52 and 132 using the method described above. The separately calibrated measurement values, as well as the signals from temperature sensor 62, are transmitted to processor 38 for conversion into temperature measurement values.

Figure 7B:
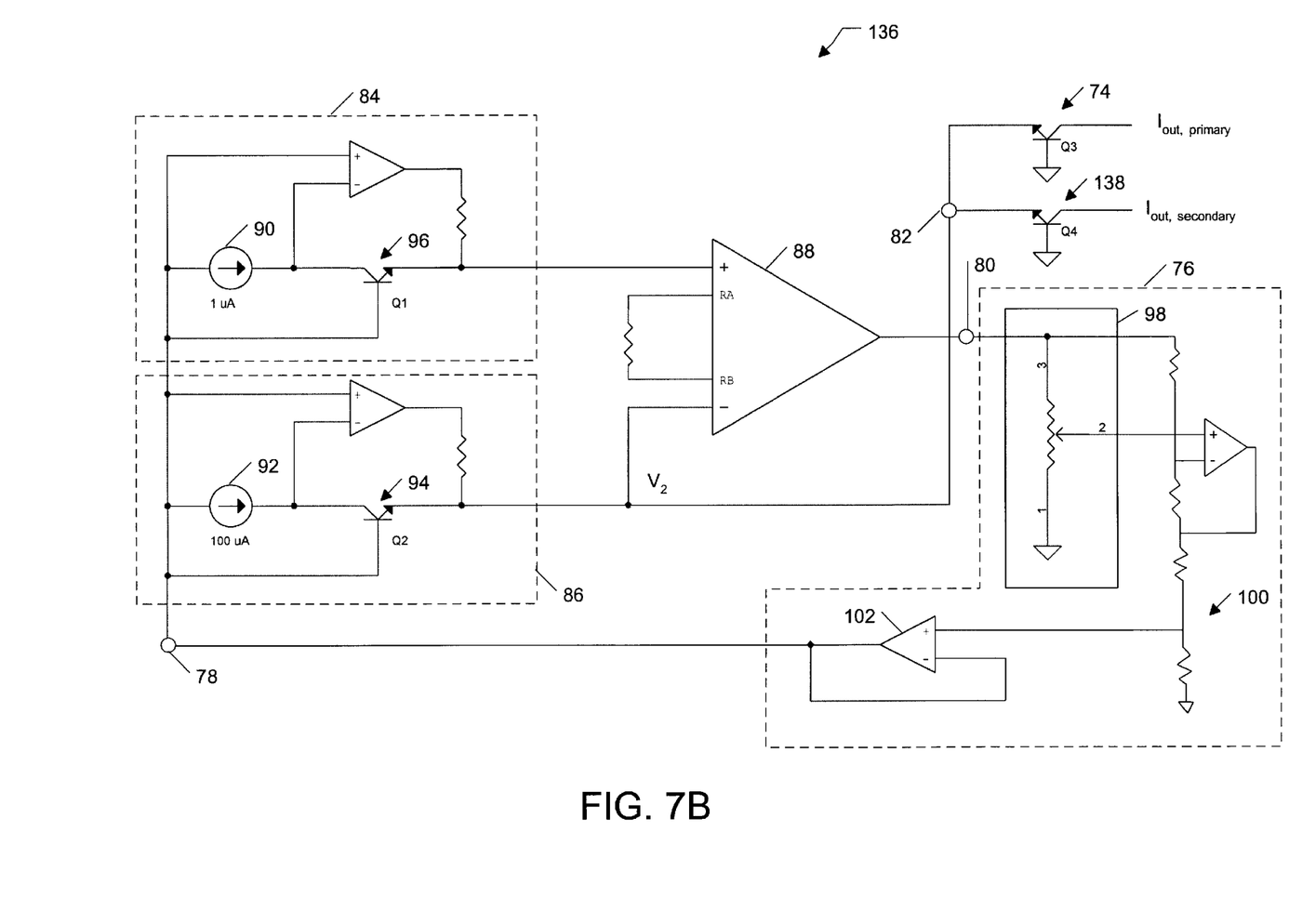
FIG. 7B is a circuit diagram of the calibration current source of FIG. 7A.

A circuit diagram of a calibration current source 136 for use in detection system 124 is shown in FIG. 7B. Calibration current source 136 has a similar construction as calibration current source 70 (FIG. 3B), except calibration current source 136 includes a secondary transistor current source 138 ($Q_4$) with an emitter coupled to biasing voltage output 82. Transistor current source 138 is matched to transistor current sources 74, 94, and 96 to assure that the output current ($I_{out,secondary}$) is substantially temperature-compensated.

Other embodiments are within the scope of the claims.

What is claimed is:

1. An apparatus comprising:
    a biasing circuit having an input, a reference voltage output and a biasing voltage output;
    an output transistor current source coupled to the biasing voltage output and configured to produce an output current; and
    an offset circuit coupled in a feedback loop between the reference voltage output and the biasing circuit input and configured to generate from the reference voltage output a variable offset voltage for selectively controlling the biasing voltage applied to the output transistor current source.

2. The apparatus of claim 1, wherein the biasing circuit includes first and second reference voltage circuits having respective inputs coupled to the biasing circuit input and respective outputs.

3. The apparatus of claim 2, wherein the first and second reference voltage circuits each includes a precision current source coupled to a transistor current source, the precision current sources substantially fixing the voltage difference between the biasing circuit input and the outputs of the first and second reference voltage circuits.

4. The apparatus of claim 3, wherein the voltages generated at the outputs of the first and second reference voltage circuits substantially correspond to the sum of the voltage generated by the offset circuit and the voltages substantially fixed by the precision current sources.

5. The apparatus of claim 3, wherein the transistor current sources of the first and second reference voltage circuits are matched to the output transistor current source.

6. The apparatus of claim 4, wherein the biasing circuit further includes a differential amplifier having first and second inputs respectively coupled to the outputs of the first and second reference voltage circuits and an output corresponding to the reference voltage output of the biasing circuit.

7. The apparatus of claim 2, wherein the biasing voltage output corresponds to the output of the second reference voltage circuit.

8. The apparatus of claim 1, wherein the offset circuit includes a digital to analog converter (DAC) that is coupled to the reference voltage output, and has an input configured to receive an input signal controlling the offset voltage generated from the reference voltage.

9. The apparatus of claim 8, wherein the DAC input signal controls the value of the output current in a one-to-one relationship.

10. The apparatus of claim 9, further including a log integrator circuit having an input coupled to receive the current output produced by the output transistor current source, and a voltage output.

11. The apparatus of claim 10, wherein the log integrator includes:
    an amplifier with an input corresponding to the log integrator input and an output corresponding to the log integrator voltage output;
    a capacitor coupled between the input and the output of the amplifier; and
    a transistor coupled in parallel with the capacitor between the input and the output of the amplifier.

12. The apparatus of claim 11, further including a switch coupled in parallel with the capacitor and the transistor between the input and the output of the amplifier.

13. The apparatus of claim 10, further comprising a processor coupled to an input of the DAC and configured to generate a calibration table relating log integrator output voltage to DAC input signal value.

14. The apparatus of claim 13, further comprising a memory configured to store the calibration table generated by the processor.

15. The apparatus of claim 9, further comprising a photodetector coupled to the input of the log integrator.

16. The apparatus of claim 15, further comprising a processing chamber and a light pipe extending into the processing chamber, wherein the photodetector is coupled directly to the light pipe.

17. The apparatus of claim 1 further including:
    an amplifier having an input coupled to receive the current output produced by the output transistor current source and an output;
    a capacitor coupled between the input and the output of the amplifier; and
    a transistor coupled in parallel with the capacitor between the input and the output of the amplifier.

18. An apparatus comprising:
    biasing circuit means having an input, a reference voltage output and a biasing voltage output;
    output current source means coupled to the biasing voltage output and configured to produce an output current; and
    offset circuit means coupled in a feedback loop between the reference voltage output and the biasing circuit input and configured to generate from the reference voltage output a variable offset voltage for selectively controlling the biasing voltage applied to the output current source means.

19. An apparatus, comprising:
    a processing chamber;
    a reflector disposed inside the processing chamber;
    a light pipe extending through the reflector; and
    a circuit board coupled directly to the light pipe, where the circuit board has a photodetector and a calibration current source that includes
        a biasing circuit having an input, a reference voltage output and a biasing voltage output,
        an output transistor current source coupled to the biasing voltage output and configured to produce an output current, and
        an offset circuit coupled in a feedback loop between the reference voltage output and the biasing circuit input and configured to generate from the reference voltage output a variable offset voltage for selectively controlling the biasing voltage applied to the output transistor current source.

20. An apparatus comprising:
    an amplifier having an input and an output;
    a capacitor coupled between the input and the output of the amplifier;
    a transistor coupled in parallel with the capacitor between the input and the output of the amplifier; and
    a switch coupled in parallel with the capacitor and the transistor between the input and output of the amplifier.

21. A method, comprising:
    generating a calibration table by applying a plurality of input signals to a calibration current source to produce a plurality of output signals;
    storing the calibration table;
    receiving an output signal of a photodetector; and
    determining the calibration input signal corresponding to the received photodetector output signal based upon the stored calibration table.

22. The method of claim 21, wherein the received photodetector output signal corresponds to a measure of radiation intensity emitted by a substrate being processed.

23. The method of claim 22, further comprising computing the temperature of the substrate based upon the calibration input signal determined to correspond to the received photodetector output signal.

24. The method of claim 21, wherein the calibration table is generated between substrate processing runs inside a processing chamber.

* * * * *